United States Patent Office 3,267,165
Patented August 16, 1966

3,267,165
PREPARATION OF MESITYLENE BY DEHYDROCONDENSATION OF ACETONE
Robert C. Kimble, Charanjit Rai, and John B. Braunwarth, Crystal Lake, Ill., assignors, by mesne assignments, to Union Oil Company of California, Los Angeles, Calif., a corporation of California
No Drawing. Filed Dec. 19, 1963, Ser. No. 331,928
8 Claims. (Cl. 260—668)

This invention relates to a method of preparing mesitylene and more particularly to a new catalyst composition comprising concentrated sulfuric acid and about 1 to 50% by weight of polyphosphoric acid for the condensation of acetone to mesitylene. The reaction may be represented as follows:

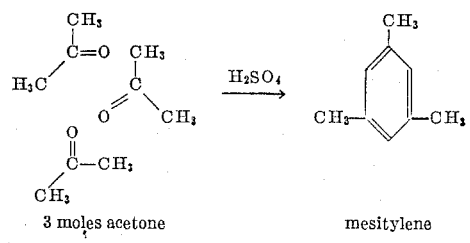

3 moles acetone         mesitylene

This illustrates one of the rare syntheses of an aromatic hydrocarbon from aliphatic starting materials. Mesitylene is useful in many organic syntheses. It is an aromatic compound having free ortho and para positions and as such is useful in diazo coupling reactions with phenols and amines. One is the coupling of mesitylene with diazotized picramide:

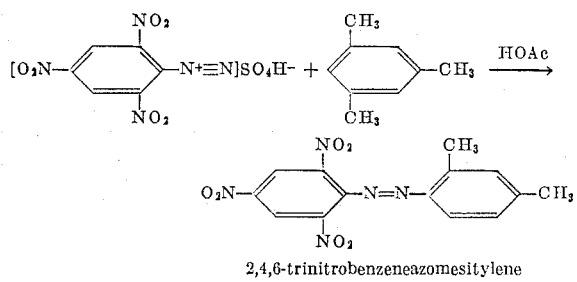

2,4,6-trinitrobenzeneazomesitylene

Mesitylene can be easily oxidized to trimesic acid, useful in resin preparation and the like. Other uses of mesitylene are known to those skilled in the art.

In accordance with this invention it has been found that the addition of polyphosphoric acid to sulfuric acid has the effect of lowering the freezing point of the mixture and improving the viscosity index, thus enabling the use of the acid in reaction involving lower temperatures necessary to prevent charring, e.g., in dehydrocondensation reactions, as illustrated by the synthesis of mesitylene from acetone. The freezing point of concentrated sulfuric acid (0° to 10° C.) presents a lower limit of operating temperatures and such temperatures sometimes allow considerable side reactions to take place. At best, the prior art yields of mesitylene from acetone are only about 16%. In accordance with this invention, the use of polyphosphoric acid with sulfuric acid produces yields of 17.5% and higher. Furthermore, charring is prevented and the total reaction time is reduced.

Accordingly it becomes a primary object of this invention to provide a method of synthesizing mesitylene from acetone using sulfuric acid containing a small amount, up to about 50%, of polyphosphoric as the catalyst.

Another object of this invention is to provide a method for synthesizing mesitylene from acetone using catalytic amounts of sulfuric acid containing a sufficient amount of polyphosphoric acid to allow the reaction to proceed without charring.

Another object of this invention is to provide a method for synthesizing mesitylene from acetone using a catalyst consisting essentially of concentrated sulfuric acid and about 1 to 50% by weight of polyphosphoric acid.

Another object of this invention is to provide a method for synthesizing mesitylene from acetone using a catalyst consisting essentially of concentrated sulfuric acid and about 2 to 30% by weight of polyphosphoric acid.

Another object of this invention is to provide a method for synthesizing mesitylene from acetone using a catalyst consisting essentially of concentrated sulfuric acid and about 10% by weight of polyphosphoric acid.

These and other objects of this invention will become apparent or be described as the specification proceeds.

In order to demonstrate the invention, a series of tests were conducted to show the freezing point and viscosity index effects of adding polyphosphoric acid (PPA) to sulfuric acid ($H_2SO_4$). The results of these tests are shown in Table I.

TABLE I

| Composition | Freezing Point [1] (° C.) | Viscosities (SUS) at— | | | | Viscosity Index [2] |
|---|---|---|---|---|---|---|
| | | 70° F. | 100° F. | 130° F. | 210° F. | |
| 98% $H_2SO_4$ | −7 | 68.6 | 51.0 | 42.6 | 33.5 | 96 |
| 96 w. percent $H_2SO_4$, 2 w. percent PPA | −28 | 68.3 | 50.9 | 42.6 | 33.5 | 100 |
| 93 w. percent $H_2SO_4$, 5 w. percent PPA | −50 | 68.4 | 51.1 | 42.8 | 33.7 | 110 |
| 78 w. percent $H_2SO_4$, 20 w. percent PPA | −71 | 74.6 | 54.7 | 45.1 | 34.9 | 142 |
| 58 w. percent $H_2SO_4$, 40 w. percent PPA | Below −70 | 121 | 76.1 | 56.7 | 38.8 | 172 |
| 100% PPA | | 1,875 | 718 | 335 | 86.9 | 120 |

[1] Freezing points were determined in the manner of ASTM pour points.
[2] Viscosity indices were determined from 100° F. and 210° F. viscosities.

From these results it is readily seen that amounts of PPA up to about 50 w. percent in concentrated $H_2SO_4$ results in lowered freezing point and improved viscosity index.

In order to compare the catalytic effect of the combination catalyst of this invention, two experiments were conducted to compare the instant process with the prior art. In experiment A the results reported by Adams and Huffeed, Org. synthesis, I, 341, Second Ed. (1956) are reproduced.

TABLE II

| Procedure | A | B | C |
| --- | --- | --- | --- |
| Acid | Conc. $H_2SO_4$ | 90 v. percent $H_2SO_4$-10 v. percent PPA | Conc. $H_2SO_4$. |
| Temp | 0 to 10° C | −13° to −10° C | −13° to −10° C. |
| Acid addition time | 30–60 min | 35 min | 35 min. |
| Mixing after acid addition | 3–4 hours | 2 hours | 2 hours. |
| Allowed to react at room temp | 6–24 hours | 0 hours | 0 hours. |
| Product isolation | Steam distillation / Fractional distillation | Steam distillation / Fractional distillation | Steam distillation. / Fractional distillation. |
| Mesitylene yield | Averages 51 g | 55 g | 43.3 g. |
| Percent of theoretical yield | 16.3% | 17.5% | 13.8% |
| Minimum total reaction time | 9½ hours | 2½ hours | 2½ hours. |

In experiment B the use of 90 vol. percent sulfuric acid containing 10 vol. percent PPA is shown to produce a greater yield at lower temperatures and shorter reaction time. Furthermore, there was no problem of the viscosity of the catalyst mixture and the handling of reaction B was facilitated. In experiment C the Adams and Huffeed Experiment (A) is duplicated at the temperatures of this invention, i.e., at −13° to 10° C. instead of 0° to 10° C. This shows the superiority of the combination catalyst of this invention as compared with concentrated sulfuric acid at −13° to −10° C. It is apparent from the data that the yield of mesitylene using concentrated sulfuric acid at −10° to −13° C. is even lower than the yield at 0° to 10° C. and that even higher yield obtained by Adams and Huffeed was lower than the yield obtained with the combination catalyst of this invention at the lower reaction temperature.

In carrying out the process of this invention, concentrated sulfuric acid is used having a concentration of about 90% to 98%. The polyphosphoric acid (PPA) used in accordance with this invention is an equilibrium mixture of ortho-, pyro, and polymeric phosphoric acids. The composition is expressed in terms of $P_2O_5$. The present commercially available product, as used to demonstrate this invention, contains 82–84 percent phosphorus pentoxide, as such containing a mixture of ortho (5%), pyro (20%), tripoly (16%), tetrapoly (16%), penta (13%), hexapoly (9%), heptapoly (6%), octapoly (4%), monopoly (4%) and hypolyphosphoric acids (1%) at the 85% level, and 66% hypolyphosphoric acids with 2–6% of each of the ortho to monopoly acids at the 86% level. PPA containing 72–89.9% $P_2O_5$ can be prepared by dehydration of commercial 85% phosphoric acid by heating, addition of the proper amount of water to $P_2O_5$ and the application of heat to establish equilibrium or by the reaction of $P_2O_5$ with 35% phosphoric acid.

By the most recent analytical methods, it has been established that commercially available PPA with 82–89.4% $P_2O_5$ contains about 10% tripoly-, 10–12% pyro-, 12% tetrapolyphosphoric acid, the remainder being ortho, some cyclic phosphoric acids and other polyphosphoric acids. Accordingly the term polyphosphoric acid, as used in this specification and claims is intended to mean and include any condensed phosphoric acid containing about 72% $P_2O_5$ to about 90% $P_2O_5$ and preferably about 82 to 89.4% $P_2O_5$. Polyphosphoric acid is an extremely viscous, colorless, hygroscopic liquid having a specific gravity of 2.060 at room temperature (20° C.). It is a rigid glass when cold and conveniently fluid at 60° C.

The catalytic mixture of this invention is prepared by mixing $H_2SO_4$ and PPA in any order so as to incorporate 1 to 50% of PPA with the $H_2SO_4$. This mixture is fluid and readily used in conventional apparatus to carry out the reaction of this invention.

The process is carried out by using the known techniques for dehydro-condensation reactions involving the conversion of acetone to mesitylene which require low temperatures to avoid charring.

No particular precautions need be taken in carrying out the process of this invention, aside from those that one skilled in the art is aware of using acetone-acid mixtures. The reaction is conducted at a temperature of about −10° C. to −50° C., e.g., the acid addition temperature is about −10° C. to about −50° C. The acid composition is concentrated sulfuric acid containing about 1% by wt. to 50% by wt. of polyphosphoric acid. The mixing time will vary with the temperature chosen for the reaction. In general the mixing time is essentially the time required to slowly heat the mixture from the acid addition temperature to the steam distillation temperature. Between about 200 to 800 parts of acetone can be used with 400 parts of acid catalyst. Preferably the weight or part ratio of acetone to acid catalyst is about 1/1.

In order to illustrate a specific procedure the following is given:

Into a 2-liter, 3-necked flask equipped with mechanical stirrer and thermometer was charged 460 g. of acetone. The acetone was cooled to −10° C. and a mixture of 41 cc. of polyphosphoric acid and 375 cc. of concentrated sulfuric (95.7%) acid was slowly added with stirring over a period of 35 minutes. Temperature was maintained at −10° to −15° C. After addition of acid was completed the mixture was slowly heated to steam distillation temperature. The flask meanwhile was equipped with a steam inlet tube extending to the bottom of the flask and a water cooled condenser attached in a downward position for distillation. The mixture was distilled with steam stripping. The crude product, collected over a one-hour period was water washed. Mesitylene was obtained by fractional distillation at 87° to 92° C. at 100 mm. pressure in 55 g. yield. This is 17.5 percent of the theoretical yield.

Because of both the physical and catalytic effect of PPA on sulfuric acid as demonstrated herein, this invention and the $H_2SO_4$-PPA mixtures described have other uses wherein one or both such properties are utilized. Sulfuric acid is widely used in chemical technology, as a catalyst, selective solvent, condensation agent, reactant, etc. To control many processes using sulfuric acid, it is frequently necessary to operate at low temperatures. It is also advantageous to operate at low temperatures without derogation of the catalytic action of the sulfuric acid. Examples of these other sulfuric acid processes that are necessarily operated at low temperatures are: the synthesis of thiophenol from benzene-sulfonyl chloride, the synthesis of nitrourea from urea nitrate, the separation of aromatic and unsaturated hydrocarbons from saturated hydrocarbons and some sulfonation reactions.

Accordingly, this invention is applicable to any reaction employing sulfuric acid wherein lower temperatures are necessary, as to avoid charring, or wherein a combination of lower temperatures and the catalytic effect of the combination of $H_2SO_4$ and PPA can be used.

The embodiments of the invention in which an exclusive property or privilege is claimed are defined as follows:

1. The process of preparing mesitylene which comprises subjecting acetone to dehydrocondensation in the presence of sulfuric acid containing at least about 1% by weight of polyphosphoric acid.

2. The process in accordance with claim 1 in which said sulfuric acid contains about 1% to 50% by weight of polyphosphoric acid and said polyphosphoric acid contains about 72 to 90% by wt. of $P_2O_5$.

3. The process in accordance with claim 1 in which the reaction is conducted at a temperature of about $-10°$ to $-50°$ C.

4. Process in accordance with claim 1 in which the sulfuric acid has a concentration of about 90% to 98%.

5. The process of preparing mesitylene which consists in subjecting acetone to dehydrocondensation in the presence of sulfuric acid containing about 10% by volume of polyphosphoric acid, said polyphosphoric acid containing about 72 to 90% by weight of phosphorus pentoxide.

6. The process in accordance with claim 5 in which said polyphosphoric acid contains about 82 to 89.4% phosphorus pentoxide.

7. The process in accordance with claim 5 in which about one part of acetone is reacted with about one part of said sulfuric acid-polyphosphoric acid mixture.

8. The process in accordance with claim 5 in which the time of the reaction is essentially the time required to slowly heat the mixture from the acid addition temperature to steam distillation temperature, and said mesitylene is recovered by steam distillation.

References Cited by the Examiner

UNITED STATES PATENTS 2,431,754   12/1947   Ipatieff et al. _____ 260—668
3,201,485   8/1965    Kovach _____ 260—668

DELBERT E. GANTZ, *Primary Examiner.*

C. R. DAVIS, *Assistant Examiner.*